(12) United States Patent
Goncalves et al.

(10) Patent No.: US 11,186,469 B2
(45) Date of Patent: Nov. 30, 2021

(54) CASTER WHEEL WITH CONSTANT FORCE MECHANISM

(71) Applicant: The Raymond Corporation, Greene, NY (US)

(72) Inventors: Fernando D. Goncalves, Binghamton, NY (US); Paul F. Finnegan, Windsor, NY (US); Greg Sigman, Sherburne, NY (US); Michael V. Brown, Endicott, NY (US)

(73) Assignee: The Raymond Corporation, Greene, NY (US)

( * ) Notice: Subject to any disclaimer, the term of this patent is extended or adjusted under 35 U.S.C. 154(b) by 376 days.

(21) Appl. No.: 16/421,933

(22) Filed: May 24, 2019

(65) Prior Publication Data

US 2019/0276289 A1    Sep. 12, 2019

Related U.S. Application Data

(63) Continuation of application No. 14/242,491, filed on Apr. 1, 2014, now Pat. No. 10,315,900.

(51) Int. Cl.
*B60B 33/04* (2006.01)
*B60G 3/02* (2006.01)
(Continued)

(52) U.S. Cl.
CPC ........ *B66F 9/07586* (2013.01); *B60B 33/045* (2013.01); *B60G 3/02* (2013.01);
(Continued)

(58) Field of Classification Search
CPC ........ B66F 9/07586; B66F 9/065; B62B 5/00; B62B 3/0612; B62B 2301/23; B60B 33/045; B60G 3/02; G08B 21/18
See application file for complete search history.

(56) References Cited

U.S. PATENT DOCUMENTS 1,242,500 A    10/1917  Wilcox
1,906,238 A     5/1933  Ramsey
(Continued)

FOREIGN PATENT DOCUMENTS

CN    101112856 A    1/2008
DE     19753412 A1   6/1999
(Continued)

OTHER PUBLICATIONS

Examination report No. 1 for standard patent application issued in corresponding Australian Application No. AU2019202681, dated Apr. 29, 2020, 6 pages.
(Continued)

*Primary Examiner* — Joseph J Hail
*Assistant Examiner* — Arman Milanian
(74) *Attorney, Agent, or Firm* — Quarles & Brady LLP

(57) ABSTRACT

A wheel assembly includes a wheel having an axle, and a constant force mechanism coupled to the wheel. The constant force mechanism includes a horizontal support, a horizontal carriage associated with the horizontal support, a vertical support oriented perpendicular with respect to the horizontal support, a vertical carriage associated with the vertical support, and a rigid arm that is pivotally coupled with the horizontal carriage, the vertical carriage, and the axle. The rigid arm is coupled with the vertical carriage at a point intermediate where the rigid arm is coupled with the horizontal carriage and the axle. The horizontal carriage is capable of being urged along the horizontal support, and the vertical carriage is capable of being urged along the vertical support.

20 Claims, 17 Drawing Sheets

(51) Int. Cl.
- *B60B 3/06* (2006.01)
- *B62B 5/00* (2006.01)
- *B66F 9/065* (2006.01)
- *B66F 9/075* (2006.01)
- *G08B 21/18* (2006.01)
- *B62B 3/06* (2006.01)

(52) U.S. Cl.
CPC .............. *B62B 3/0612* (2013.01); *B62B 5/00* (2013.01); *B66F 9/065* (2013.01); *G08B 21/18* (2013.01); *B62B 2301/23* (2013.01)

(56) References Cited

U.S. PATENT DOCUMENTS

| | | |
|---|---|---|
| 2,339,940 A | 1/1944 | Noros |
| 2,426,513 A | 8/1947 | Linn |
| 2,438,571 A | 3/1948 | Glenway, Jr. |
| 2,443,480 A | 6/1948 | Schwitzer |
| 2,455,787 A | 12/1948 | Linn |
| 2,580,557 A | 1/1952 | Kolbe |
| 2,606,021 A | 8/1952 | Hexel |
| 2,709,829 A | 6/1955 | Marvin |
| 2,831,699 A | 4/1958 | Holmes |
| 2,891,764 A | 6/1959 | Pearne |
| 3,331,618 A | 7/1967 | Head |
| 3,380,546 A | 4/1968 | Rabjohn |
| 3,764,157 A | 10/1973 | LeBlanc |
| 4,000,912 A | 1/1977 | Donald et al. |
| 4,246,567 A | 1/1981 | Miller |
| 4,263,979 A | 4/1981 | Sturgill |
| 4,371,191 A | 2/1983 | Goldberg et al. |
| 4,449,725 A | 5/1984 | Robison et al. |
| 4,534,433 A | 8/1985 | Burbank et al. |
| 4,598,784 A | 7/1986 | Tronich et al. |
| 4,637,093 A | 1/1987 | Kassai |
| 4,750,579 A * | 6/1988 | Jarl .................... B60G 17/0272 180/209 |
| 4,805,710 A | 2/1989 | Jarl et al. |
| 4,884,936 A | 12/1989 | Kawada |
| 5,072,960 A | 12/1991 | Sperko |
| 5,099,708 A | 3/1992 | Chung |
| 5,163,701 A | 11/1992 | Cromley, Jr. |
| 5,326,128 A | 7/1994 | Cromley, Jr. |
| 5,551,119 A | 9/1996 | Wörwag |
| 5,579,859 A | 12/1996 | Quellhorst et al. |
| 5,590,735 A | 1/1997 | Cartier |
| 5,628,377 A | 5/1997 | Le Gloan |
| 5,649,454 A | 7/1997 | Midha et al. |
| 5,685,555 A | 11/1997 | McCormick et al. |
| 6,135,485 A | 10/2000 | Filbrun |
| 6,244,025 B1 | 6/2001 | Ferris et al. |
| 6,357,077 B1 | 3/2002 | Jones, Jr. et al. |
| 6,484,359 B1 | 11/2002 | Guttmann et al. |
| 6,543,798 B2 | 4/2003 | Schaffner et al. |
| 6,550,101 B2 | 4/2003 | Plate |
| 6,604,414 B1 | 8/2003 | Claussen et al. |
| 6,759,952 B2 | 7/2004 | Dunbridge et al. |
| 6,940,415 B2 | 9/2005 | Nagata et al. |
| 7,017,228 B2 | 3/2006 | Silverstein et al. |
| 7,070,028 B2 | 7/2006 | Reybrouck et al. |
| 7,093,319 B2 | 8/2006 | Lemeur, Jr. et al. |
| 7,267,349 B2 | 9/2007 | Sica et al. |
| 7,497,449 B2 | 3/2009 | Logger |
| 7,593,797 B2 * | 9/2009 | Izawa ................ B60G 17/0165 267/218 |
| 7,762,129 B2 | 7/2010 | Niklas et al. |
| 7,770,904 B2 | 8/2010 | Passeri |
| 7,782,183 B2 | 8/2010 | Wieser |
| 7,861,820 B1 | 1/2011 | Goodwin et al. |
| 7,874,223 B2 | 1/2011 | Sugar et al. |
| 7,896,358 B2 | 3/2011 | Hoff |
| 7,918,514 B2 | 4/2011 | Dal Pra |
| 8,356,688 B2 | 1/2013 | Passer et al. |
| 8,720,616 B2 | 5/2014 | Kofoed et al. |
| 8,731,785 B2 | 5/2014 | McCabe et al. |
| 8,733,770 B2 | 5/2014 | Nafziger et al. |
| 8,763,990 B2 | 7/2014 | Day |
| 9,002,557 B2 | 4/2015 | Goncalves et al. |
| 9,085,203 B2 | 7/2015 | Duppong et al. |
| 9,168,784 B2 | 10/2015 | DeChristopher et al. |
| 9,302,893 B2 | 4/2016 | Goncalves et al. |
| 9,403,667 B2 | 8/2016 | McCabe et al. |
| 9,533,863 B2 | 1/2017 | Plachta et al. |
| 9,956,822 B1 | 5/2018 | Yu |
| 2004/0055108 A1 | 3/2004 | Lemeur, Jr. et al. |
| 2005/0144923 A1 | 7/2005 | Melone et al. |
| 2005/0156391 A1 * | 7/2005 | Krenzin .............. B66F 9/07586 280/5.515 |
| 2006/0090885 A1 | 5/2006 | Montgomery et al. |
| 2006/0213305 A1 | 9/2006 | Sugar et al. |
| 2006/0231312 A1 | 10/2006 | Passer |
| 2009/0001740 A1 | 1/2009 | Kofoed et al. |
| 2011/0126617 A1 | 6/2011 | Apezteguia et al. |
| 2012/0049610 A1 | 3/2012 | Lew |
| 2012/0235100 A1 * | 9/2012 | McCabe .............. B62B 3/0612 254/2 R |
| 2013/0278406 A1 | 10/2013 | Weston |
| 2014/0060715 A1 | 3/2014 | Winshtein et al. |
| 2014/0260233 A1 | 9/2014 | Giovanardi et al. |
| 2015/0274495 A1 | 10/2015 | Goncalves et al. |

FOREIGN PATENT DOCUMENTS

| | | |
|---|---|---|
| EP | 0556543 A2 | 8/1993 |
| EP | 1022166 A2 | 7/2000 |
| EP | 1588979 A2 | 10/2005 |
| EP | 1147968 B1 | 5/2006 |
| EP | 1022166 B1 | 10/2008 |
| FR | 2544259 A1 | 10/1984 |
| JP | H11180104 A | 7/1999 |
| JP | 2000142012 A | 5/2000 |
| JP | 2002087039 A | 3/2002 |
| JP | 2003079671 A | 3/2003 |
| JP | 2005350154 A | 12/2005 |
| JP | 2010089615 A | 4/2010 |
| JP | 2011046336 A | 3/2011 |

OTHER PUBLICATIONS

Extended European search report issued in European Application No. EP17184310.5, dated Dec. 12, 2017, 7 papges.

Extended European search report; Appln. No. EP15161975.6; 8 pages; dated Aug. 11, 2015.

Frirst Office Action issued in corresponding Chinese Patent Application No. 201510271776.1, dated Jun. 5, 2018, 16 pages.

* cited by examiner

CASTER WHEEL WITH CONSTANT FORCE MECHANISM

CROSS REFERENCES TO RELATED APPLICATIONS

This application is a continuation of U.S. application Ser. No. 14/242,491, filed on Apr. 1, 2014, and entitled "Caster Wheel with Constant Force Mechanism," which is hereby incorporated herein by reference in its entirety and is to be considered a part of this specification.

STATEMENT REGARDING FEDERALLY SPONSORED RESEARCH

Not Applicable.

BACKGROUND OF THE INVENTION

The present invention relates to a wheel assembly for a vehicle, and more particularly to a wheel assembly for a material handling vehicle such as a pallet truck.

Vehicles, such as material handling vehicles (e.g., pallet trucks, reach trucks, counterbalance trucks, tow tractors, order pickers, etc.), utility carts, wagons, etc. incorporate wheels in a variety of roles, such as a drive wheel, a steering wheel, a support wheel, or some combination thereof. In some configurations, the wheel assembly includes a caster wheel. All of the wheels will wear over time and will eventually require maintenance to repair or replace the wheel.

In the material handling industry increased load carried by the wheels, smaller wheel diameters, and higher rotational velocities of the wheels tend to exacerbate the wear, further impacting the useful life of a wheel.

A material handling vehicle, and in particular, a pallet truck is often equipped with a main drive wheel and one or more additional wheels. These additional wheels, which may be casters, are included, for example, to enhance handling and maneuverability. Although casters behave well when properly maintained, it can be possible for the caster to fall out of adjustment as the drive wheel wears. Adjusting casters can be a time consuming process.

Traditional casters require periodic adjustment to compensate for drive wheel wear. This adjustment is normally done by adding or removing shims between the caster and the vehicle to raise or lower the caster. The adjustment process can be labor intensive. In certain cases, to adjust the caster, the vehicle must be elevated and the caster must be removed before shims can be added or removed.

More advanced casters have adjustment screws that can raise or lower the caster to facilitate periodic adjustments. The adjustment screws can be accessed from the side on some designs and from the top on others. In this case, the casters can be adjusted without removing the caster but the adjustment point is under the vehicle. Top adjust casters provide an easier access point but require a hole in the operator floor.

Fundamentally, a disadvantage of current caster systems for material handling vehicles is the necessity for periodic adjustment. Therefore, a need exists for an improved wheel assembly for a vehicle that reduces the frequency of periodic adjustments of the caster wheels. Furthermore, a need exists for a means for providing a definitive indication to assist maintenance technicians in determining when drive wheel or caster wheel repair or replacement is required.

SUMMARY

The present disclosure provides a caster wheel assembly that may require less frequent adjustment in the field in response to drive wheel wear. In one embodiment, the caster wheel assembly may generate a constant downward force as the drive wheel wears. The caster wheel assembly may be tuned to provide an appropriate nominal downward force. This downward force may be tunable based on desired vehicle performance characteristics. As the drive wheel wears, the deflection across the caster may increase while the caster force remains fixed at the nominal level. In some embodiments, the desired force profile may be achieved with a caster wheel assembly including a constant force mechanism. The constant force mechanism may enable the caster wheel to apply a constant downward force on a ground contact surface throughout the operation of the material handling vehicle. In some embodiments, a variable constant force mechanism may include a secondary spring element that may provide additional resistance once the deflection of the caster wheel exceeds a threshold value.

The present disclosure generally provides for a wheel assembly that includes a wheel having an axle, and a constant force mechanism coupled to the wheel. The constant force mechanism includes a horizontal support, a horizontal carriage associated with the horizontal support, a vertical support oriented perpendicular with respect to the horizontal support, a vertical carriage associated with the vertical support, and a rigid arm that is pivotally coupled with the horizontal carriage, the vertical carriage, and the axle. The rigid arm is coupled with the vertical carriage at a point intermediate where the rigid arm is coupled with the horizontal carriage and the axle. The horizontal carriage is capable of being urged along the horizontal support, and the vertical carriage is capable of being urged along the vertical support.

In some embodiments, the wheel assembly further includes a horizontal spring that urges the horizontal carriage along the horizontal support, and a vertical spring that urges the vertical carriage along the vertical support. In some aspects, the vertical spring is a first vertical spring, and a second vertical spring is disposed coaxial with the first vertical spring. In some embodiments, the second vertical spring applies a greater downward force than the first vertical spring. In some aspects, the wheel assembly further includes a position sensor system that can measure a deflection across the wheel. In some embodiments, the position sensor system includes a vertical position sensor and a horizontal position sensor. In still further aspects, the vertical carriage is coupled with the rigid arm at a midpoint of the rigid arm. In some embodiments, the wheel assembly further includes a support that is coupled to the horizontal support and the vertical support of the constant force mechanism. In some aspects, the support is a unitary component, and includes vertical and horizontal portions that are connected with the vertical support and the horizontal support, respectively.

In some embodiments, a wheel assembly includes a wheel having a hub and an axle, a support, and a constant force mechanism coupled to the wheel and to the support. The constant force mechanism includes a first support, a first carriage associated with the first support, a first resistance device that is coaxial with the first support, a second support, a second carriage associated with the second support, a second resistance device that is coaxial with the second support, and a rigid arm that is pivotally coupled with the first carriage, the second carriage, and the axle. The first carriage is capable of being urged along the first support, and the second carriage is capable of being urged along the second support. In some embodiments, the first support and the second support are perpendicularly offset. In some aspects, the wheel assembly further includes a third resistance device opposing movement of one of the first and second carriages. In some embodiments, the wheel is one of a load wheel, a drive wheel, a caster wheel, and a steering wheel. In some aspects, the wheel assembly further includes a first position sensor that measures displacement of one of the first carriage or the second carriage. In some embodiments, the first resistance device and the second resistance device are springs. In some aspects, a first spring constant of the first resistance device and a second spring constant of the second resistance device are the same.

In some aspects, a material handling vehicle includes a vehicle chassis, a fork carriage coupled to the vehicle chassis, at least one lifting fork coupled to the fork carriage and displaceable in at least one dimension, a drive wheel coupled to the vehicle chassis, and at least one wheel assembly coupled to the vehicle chassis. The wheel assembly includes a wheel having an axle, and a constant force mechanism coupled to the wheel. The constant force mechanism includes a horizontal support, a horizontal carriage associated with the horizontal support, a vertical support oriented perpendicular with respect to the horizontal support, a vertical carriage associated with the vertical support, and a rigid arm that is pivotally coupled with the horizontal carriage, the vertical carriage, and the axle. The horizontal carriage is capable of being urged along the horizontal support, and the vertical carriage is capable of being urged along the vertical support.

In some embodiments, the wheel assembly further includes a horizontal spring that urges the horizontal carriage along the horizontal support, and a vertical spring that urges the vertical carriage along the vertical support. In some aspects, the vertical spring is a first vertical spring, and a second vertical spring is disposed coaxial with the first vertical spring. In some aspects, the wheel assembly further includes a position sensor system that can measure a deflection across the caster wheel.

These and still other aspects will be apparent from the description that follows. In the detailed description, preferred example embodiments will be described with reference to the accompanying drawings. These embodiments do not represent the full scope of the invention; rather the invention may be employed in other embodiments. Reference should therefore be made to the claims herein for interpreting the breadth of the invention.

DETAILED DESCRIPTION

Figure 1:
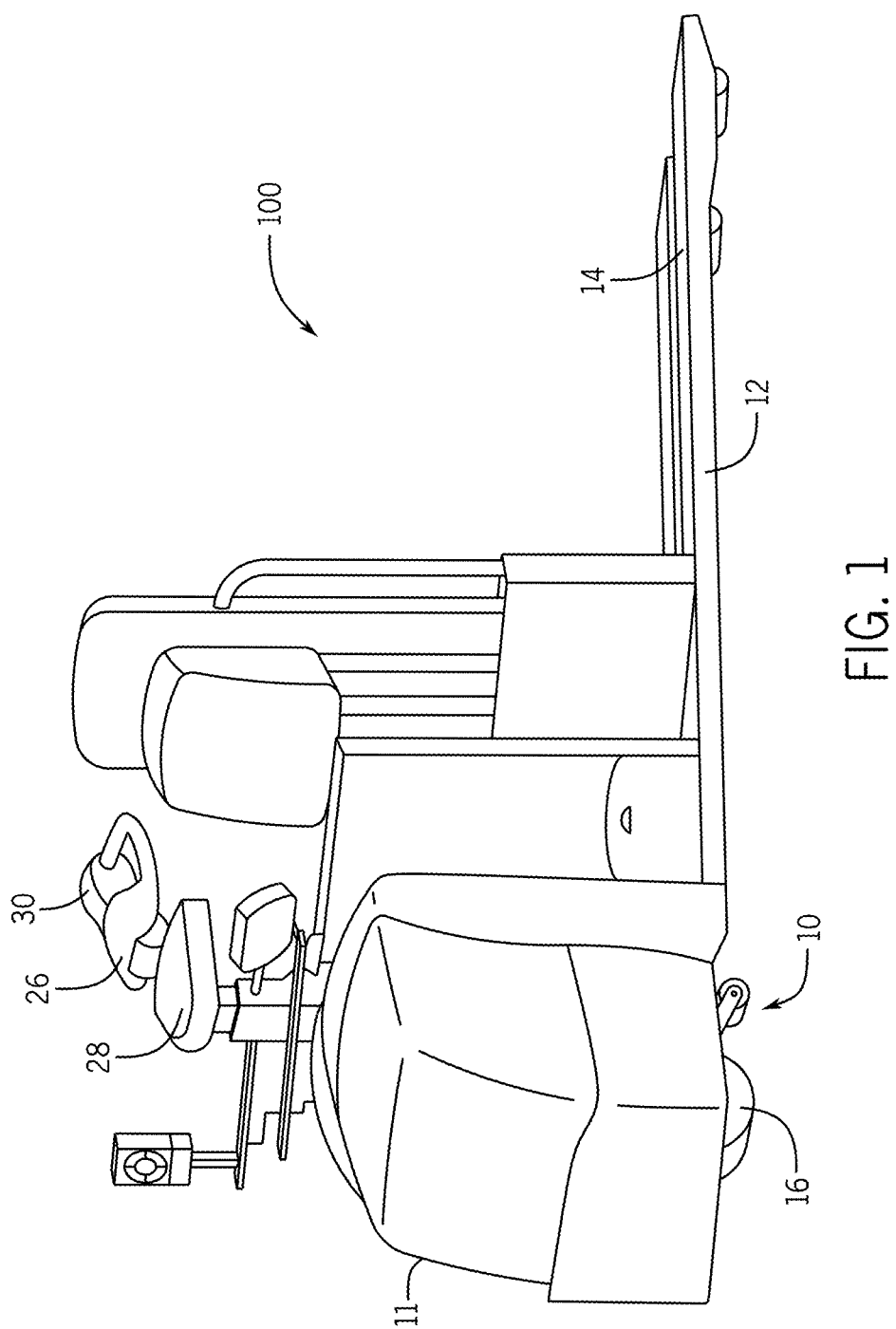
FIG. 1 is a front perspective view of a material handling vehicle equipped with a caster with a constant force mechanism and a position sensor system.
Figure 2:
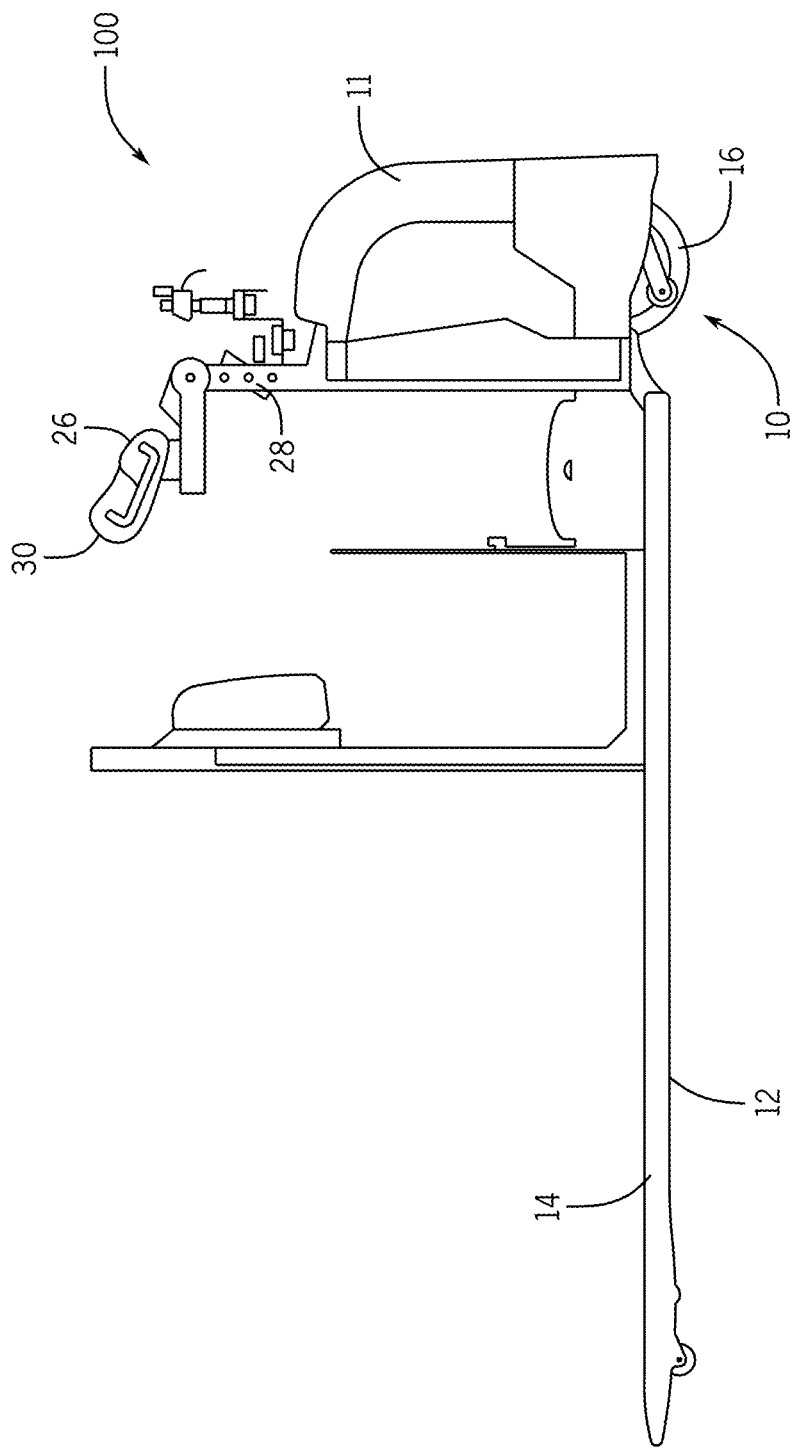
FIG. 2 is a side view of a material handling vehicle equipped with a caster with a constant force mechanism and a position sensor system.
Figure 3:
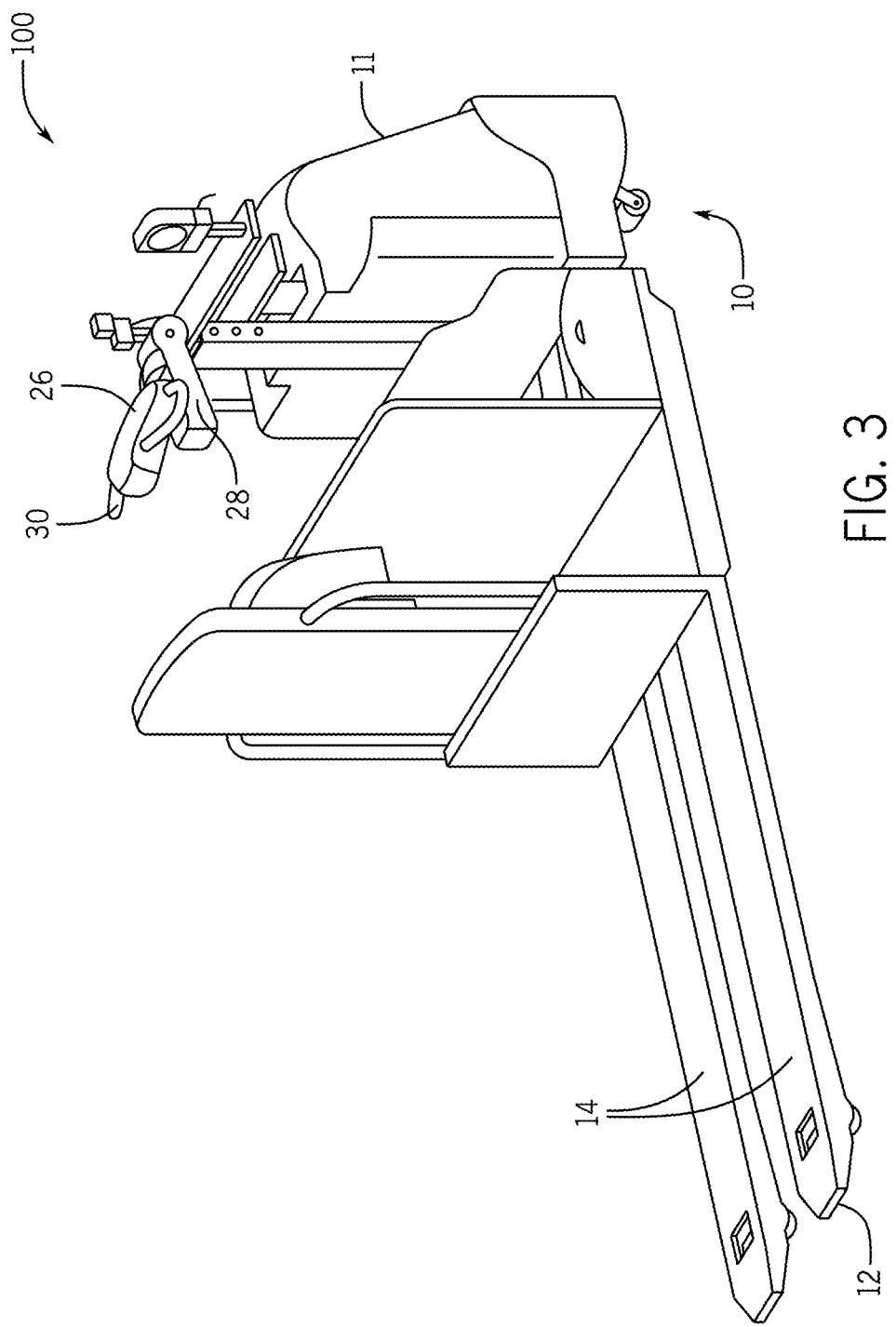
FIG. 3 is a rear perspective view of a material handling vehicle equipped with a caster with a constant force mechanism and a position sensor system.
Figure 4:
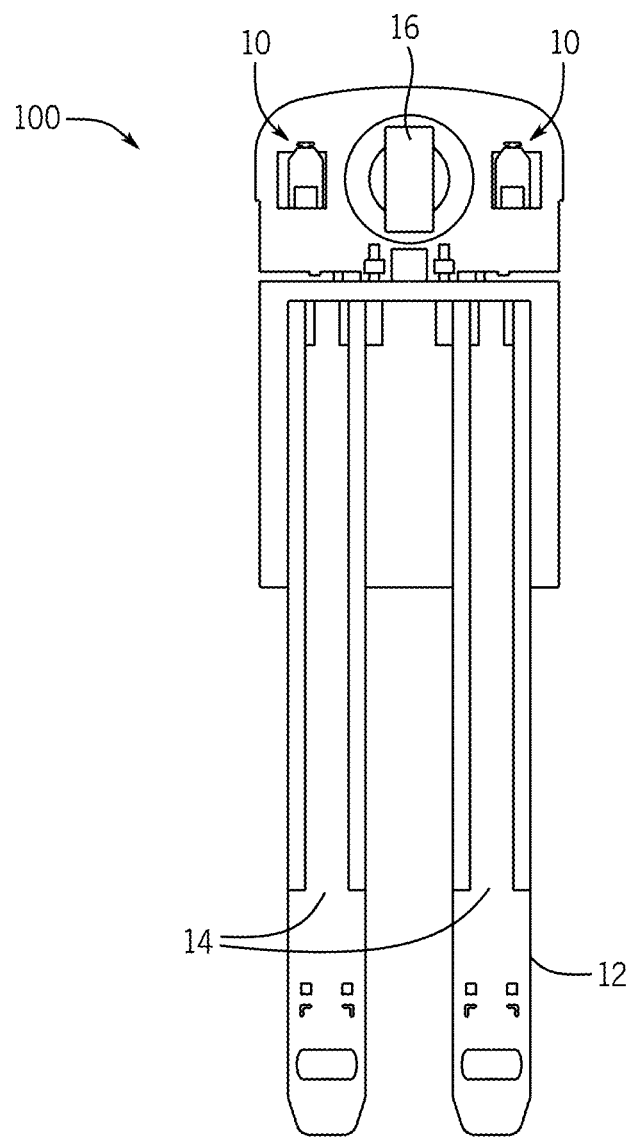
FIG. 4 is a bottom view of a material handling vehicle equipped with a caster with a constant force mechanism and a position sensor system.

Several example embodiments of wheel assemblies, including a caster with a constant force mechanism and a caster with a variable constant force mechanism will be described. As one skilled in the art will appreciate, however, the wheel assembly concept may be implemented in a variety of different configurations and arrangements. Moreover, while the example wheel assembly is generally described with reference to a pallet truck, the wheel assembly concept is equally applicable to other types and styles of powered and unpowered vehicles, such as pallet trucks, tow tractors, sideloaders, counterbalanced trucks, reach trucks, wagons, utility trailers, and the like, as non-limiting examples.

A vehicle in the form of a pallet truck is illustrated in FIGS. 1-4. A motorized hand/rider low-lift pallet truck 100 is comprised of fork carriage 12 having a pair of load bearing forks 14 that are coupled to a power unit 11. The power unit 11 typically includes a housing that houses a hydraulic lift motor pump and traction motor, a drive wheel 16, and a battery housing that houses a battery. Alternatively, the battery can be mounted directly to the pallet truck 100 without a housing. The drive wheel 16 is coupled to a steering mechanism 26 having a tiller arm 28 and an operator control handle 30. The steering mechanism 26 is rotatable to the right and left to control the steering of the pallet truck 100.

The fork carriage 12 has a vertical span of several inches, traveling up and down between ground level and the maximum height. The pallet truck 100 is designed such that the forks 14 are inserted under a load to be moved such as a pallet of goods and the fork carriage 12 lifts the load off of the ground. The pallet truck 100 may be driven to another location where the fork carriage 12 is lowered to place the load on the ground and the forks 14 are withdrawn from the load. One skilled in the art will appreciate the operation and interconnection of the various components of the example pallet truck 100.

Figure 5:
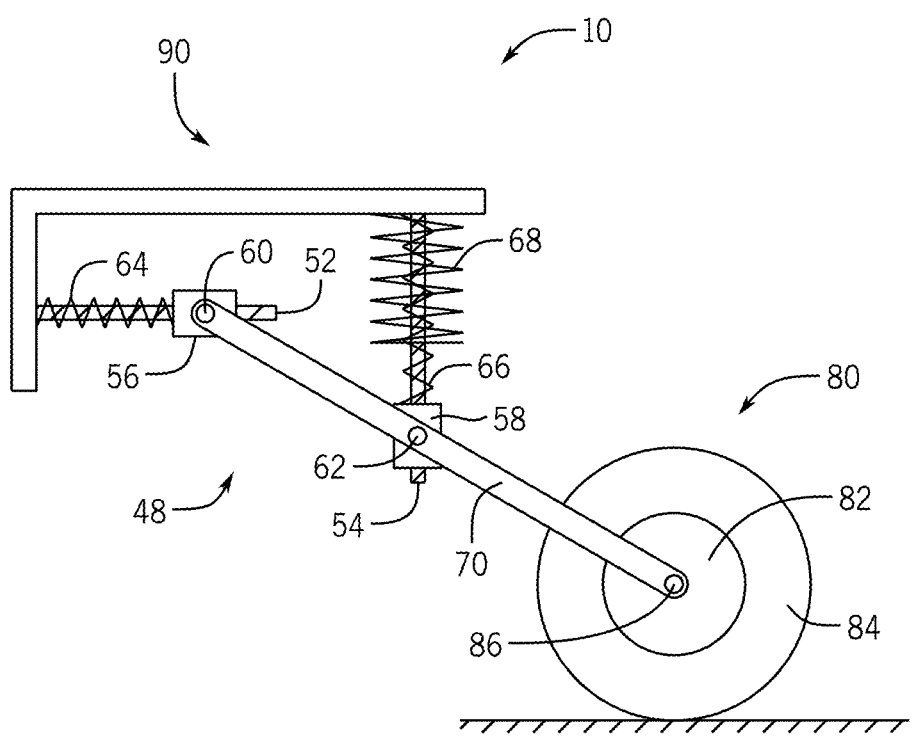
FIG. 5 is a schematic illustration of an embodiment of a caster with a variable constant force mechanism.
Figure 6:
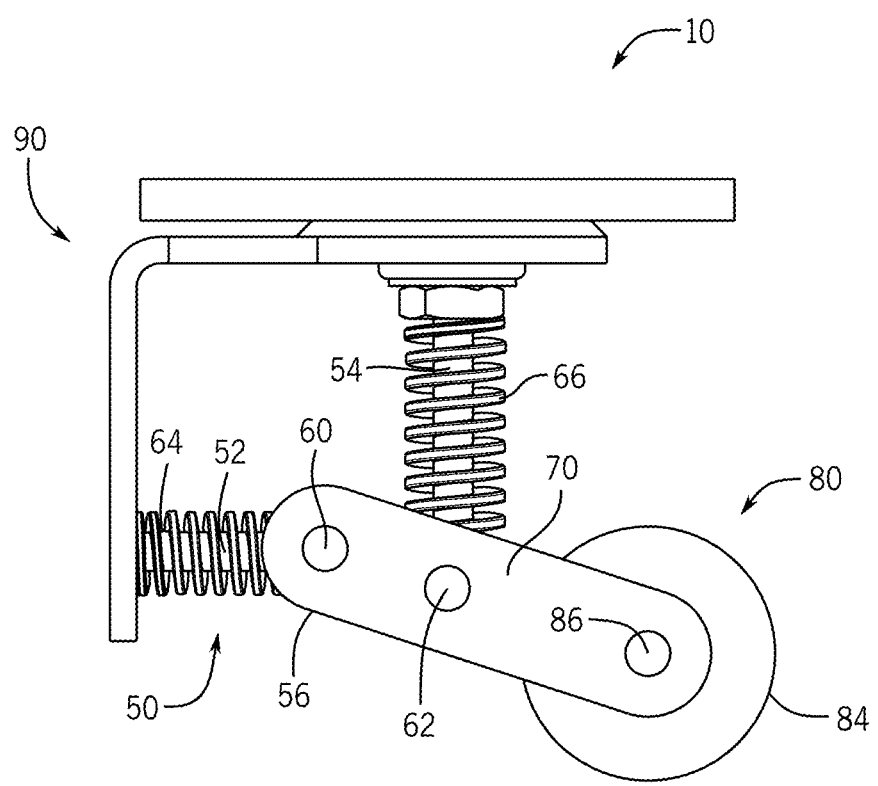
FIG. 6 is a side view of an embodiment of a caster with a constant force mechanism.
Figure 7A:
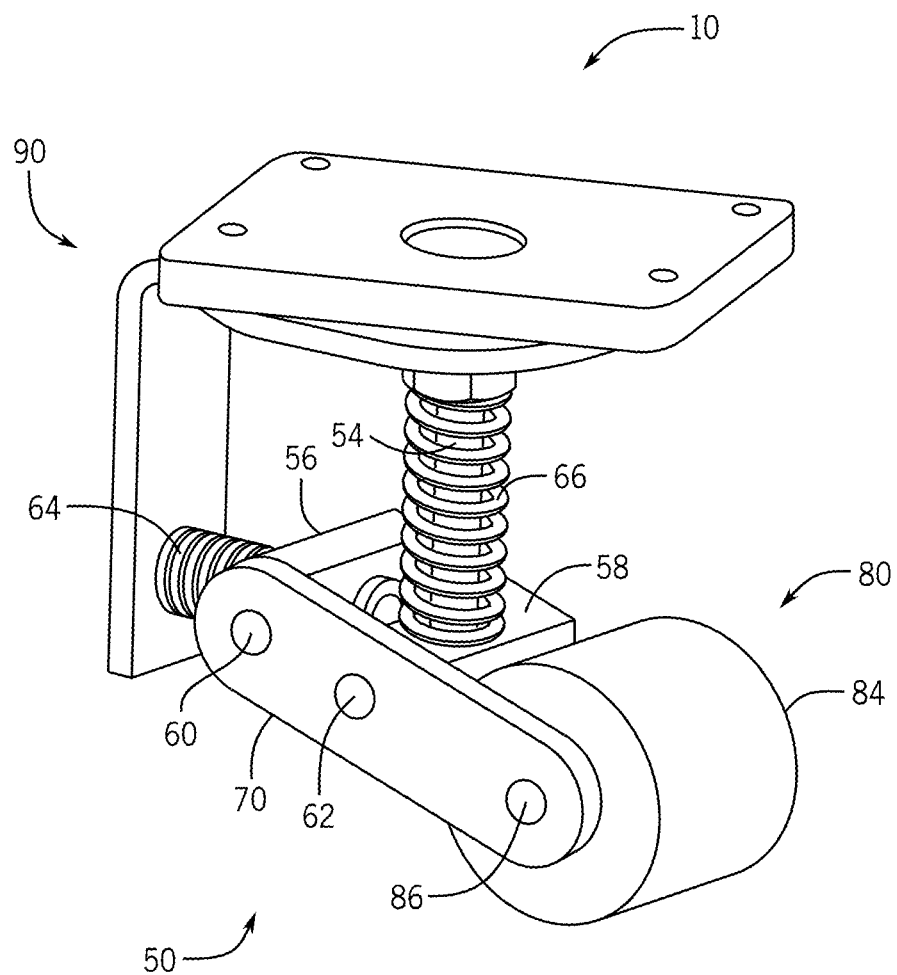
FIG. 7A is a perspective view of a caster with a constant force mechanism as seen in FIG. 6.
Figure 7B:
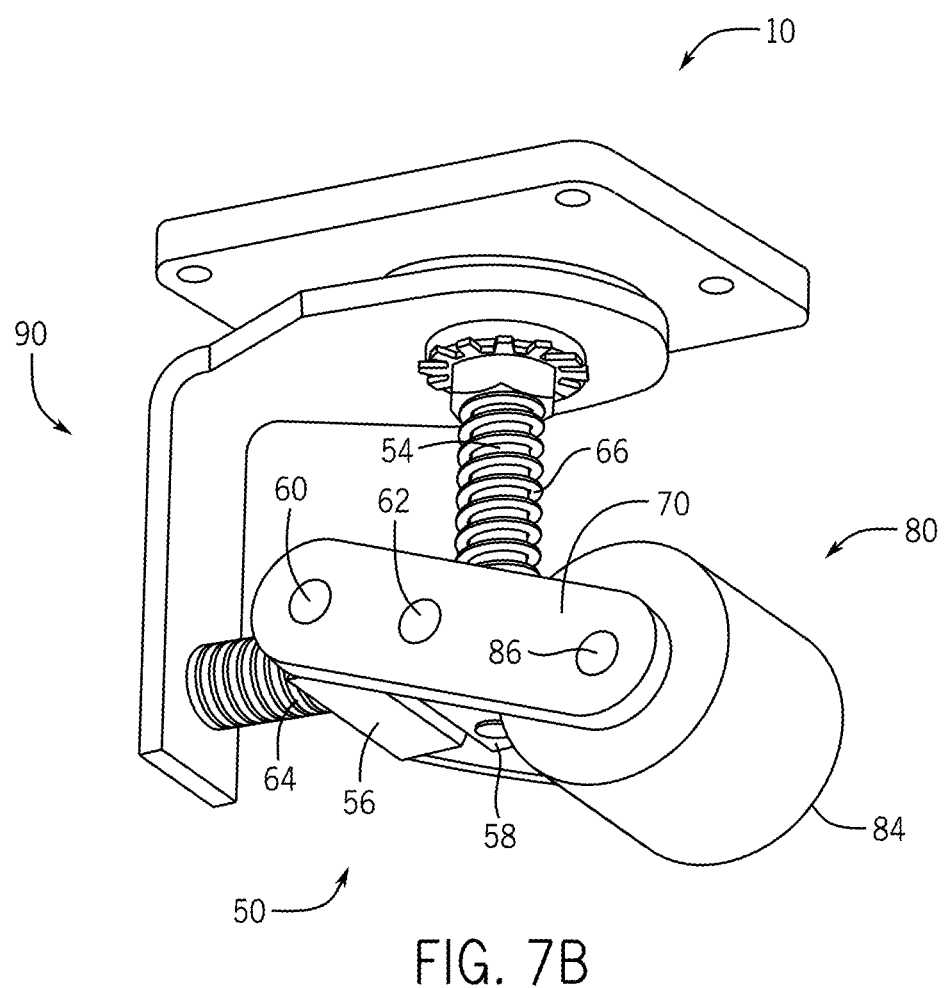
FIG. 7B is an alternate perspective view of the caster with a constant force mechanism of FIG. 6.
Figure 8A:
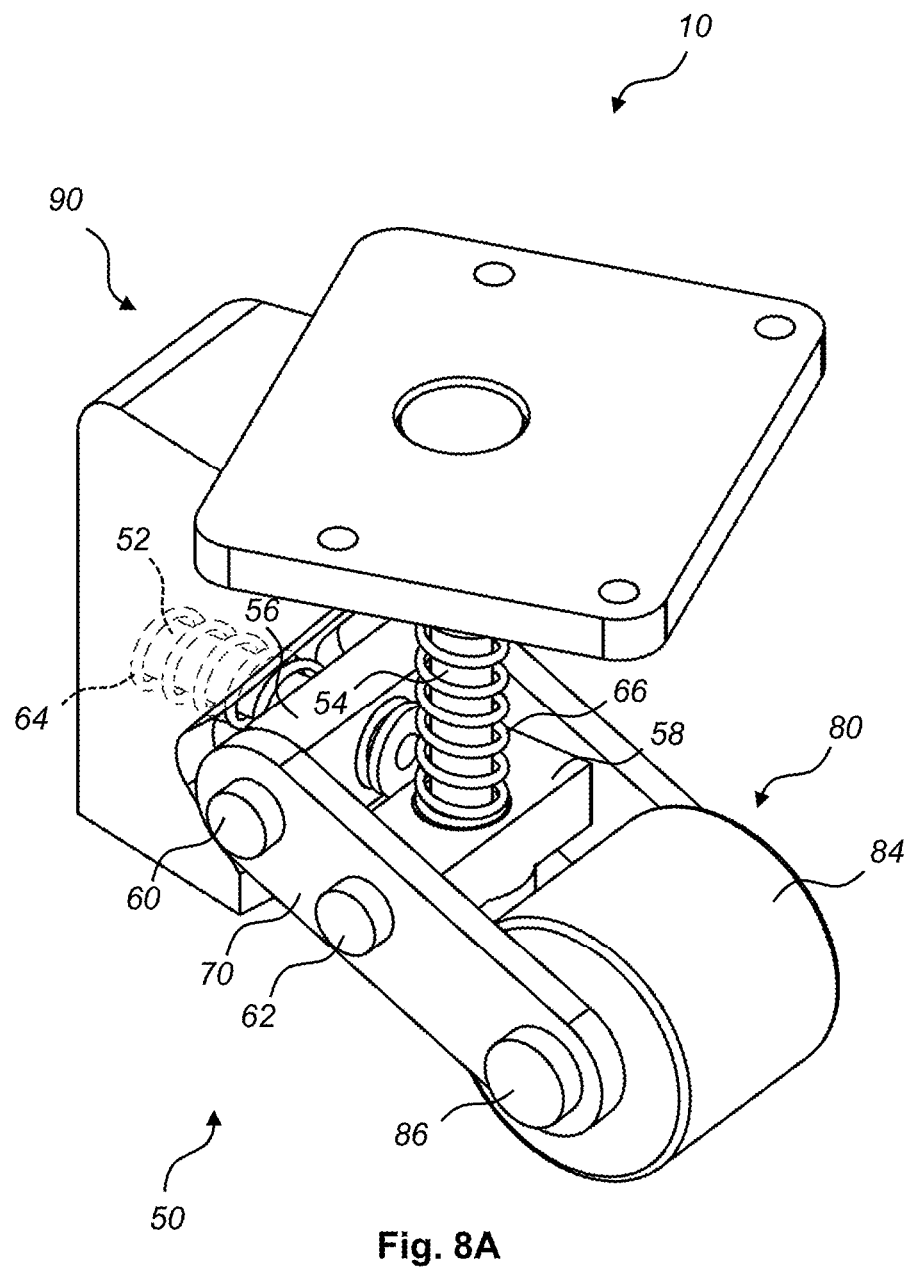
FIG. 8A is a perspective view of an alternative embodiment of a caster with a constant force mechanism.
Figure 8B:
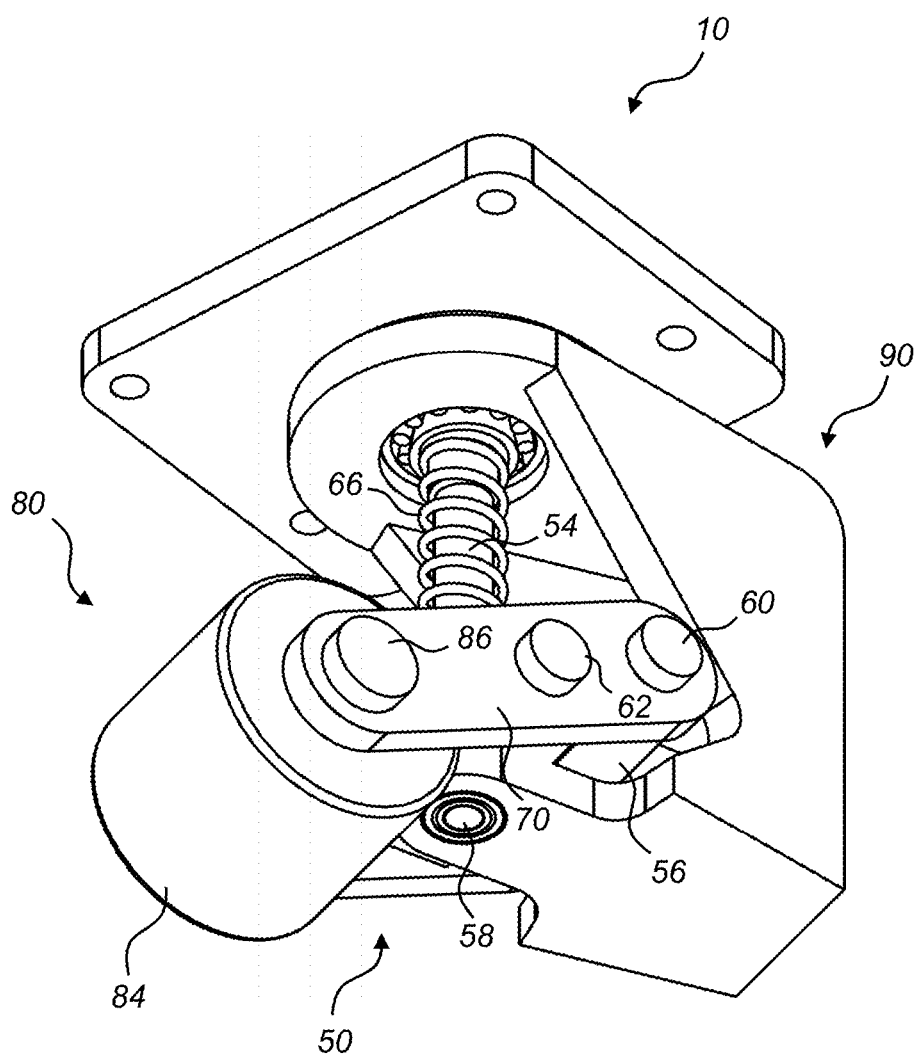
FIG. 8B is an alternate perspective view of the caster with a constant force mechanism of FIG. 8A.

Regarding the example pallet truck 100, one or more wheel assemblies 10 are positioned at the base of the pallet truck 100 and can be positioned near the drive wheel 16. In one embodiment, the wheel assemblies 10 are casters. Referring to FIG. 5, the wheel assembly 10 can include features such as a support 90, a wheel 80, and a variable constant force mechanism 48. In the illustrated embodiment, wheel 80 is coupled to variable constant force mechanism 48, which is in turn coupled to support 90. Furthermore, support 90 can be pivotally coupled to pallet truck 100. In other embodiments illustrated in FIGS. 6-8B, a constant force mechanism 50 is shown. A secondary spring 68 (discussed below) can be included to provide the "variable" feature to produce the variable constant force mechanism 48.

The wheel 80 is illustrated as a caster-type wheel including a hub 82 about which a tire 84 is secured. In one form, the hub 82 is metallic (e.g., steel) and the tire 84, which may be non-metallic (e.g., plastic, such as, polyurethane), is molded over or secured to the hub 82. An axle 86 extends through from the wheel 80 to couple to a rigid arm 70, which is a component of the variable constant force mechanism 48. Snap rings, clips, or any other restraint may be used to capture the axle 86, as will be appreciated by one skilled in the art given the benefit of this disclosure.

While the axle 86 defines a circular cross-section in a plane perpendicular to the longitudinal axis of the axle 86, many other form factors are available, such as square, hexagonal, triangular, and the like. Furthermore, any number and/or type of wheels 80 may be supported by the axle 86; for instance, a pair of solid rubber wheels may be supported by the axle 86, or one or more plastic wheels may be incorporated.

Figure 9:
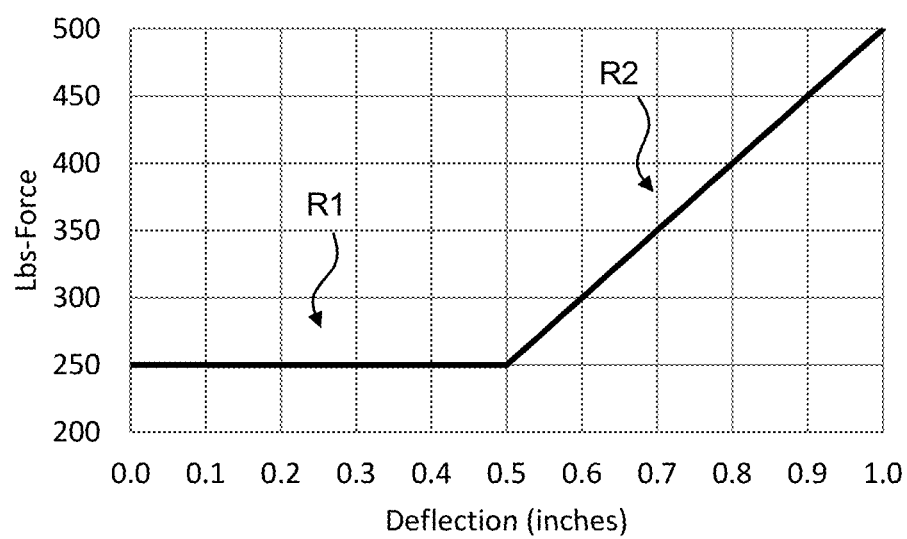
FIG. 9 is an example of a force profile for two operating regimes (R1, R2) of a caster with a variable constant force mechanism.

During operation of the pallet truck 100, the wheel assemblies 10 can be tuned to provide an appropriate nominal downward force throughout a first operating regime R1 (e.g., 250 lbs in FIG. 9). This downward force can be tunable based on desired vehicle performance characteristics. As the drive wheel 16 wears, the deflection across the wheel 80 will increase but the force applied to the wheel 80 remains fixed at the nominal level. In a second operating regime (R2 in FIG. 9) where the deflection across the wheel 80 exceeds a predetermined threshold value (e.g. 0.5 inches in FIG. 9), the force applied by the wheel assembly 10 can be increased to accommodate large deflection events such as turning. In a turning event, the deflection can exceed the predetermined value and the wheel assembly 10 can provide the appropriate roll stiffness. Whereas FIG. 9 illustrates a linear increase in force as deflection increases beyond the predetermined threshold, a non-linear force profile may also be used. In one aspect, operating regimes R1 and R2 and corresponding force profiles can vary and may be chosen based on realistic drive wheel 16 wear rates. Moreover, in some embodiments, only a single operating regime may be implemented, whereas in other embodiments, two, three or more operating regimes may be implemented.

The constant force operating regime can be variable and can be chosen based on realistic drive wheel 16 wear rates. Realizing the proposed wheel force profile would reduce the frequency of maintenance required to maintain optimal vehicle performance. One way to achieve the desired force profile can be to use a constant force mechanism. Many constant force mechanisms exist in the art and an example of such a mechanism is shown in U.S. Pat. No. 7,874,223, which is herein incorporated by reference in its entirety. This type of constant force mechanism can be incorporated into a wheel assembly 10 as shown in FIG. 5 to resist displacement of the wheel 80 in the wheel assembly 10. The illustrated variable constant force mechanism 48 includes a horizontal support 52 and a vertical support 54 which can be oriented perpendicular to each other. The horizontal support 52 is associated with a horizontal carriage 56 and a resistance device, such as a spring 64. Similarly, the vertical support 54 is associated with a vertical carriage 58 and a vertical spring 66. Furthermore, the rigid arm 70 can be pivotally coupled to the horizontal 56 and vertical 58 carriages at point 60 and point 62, respectively. In the illustrated embodiment, point 60 at one end of the rigid arm 70 is coupled to the horizontal carriage 56 and intermediate point 62 located between the rigid arm 70 ends is coupled to the vertical carriage 58. Horizontal spring 64 urges the horizontal carriage 56 horizontally along a horizontal axis defined by the horizontal support 52 and the vertical spring 66 urges the vertical carriage 58 downwardly along a vertical axis defined by the vertical support 54. Therefore, according to Hooke's law, a force due to the horizontal spring 64 acting on the horizontal carriage 56 can be approximated by equation 1:

$$F_H = k_H x_H \quad \text{(Eq. 1)}$$

where $F_H$ is the component of horizontal force acting on the horizontal carriage 56 due to the horizontal spring 64, $x_H$ is the horizontal displacement and $k_H$ is the spring rate constant of spring 64. Similarly, a force on the vertical carriage 58 due to the vertical spring 66 can be approximated by equation 2:

$$F_V = k_V x_V \quad \text{(Eq. 2)}$$

where $F_V$ is the component of vertical force acting on the vertical carriage 58 due to the vertical spring 66, $x_V$ is the vertical displacement and $k_V$ is the spring rate constant of spring 66. It can be determined, as previously demonstrated in U.S. Pat. No. 7,874,223, that for the geometry shown in U.S. Pat. No. 7,874,223, when $k_V$ and $k_H$ are equivalent and horizontal support 52 and vertical support 54 are orientated perpendicular to each other:

$$F_R = k_V L \quad \text{(Eq. 3)}$$

where $F_R$ is the resultant force at carriage 58, and L is the length of the arm between point 60 and point 62 in FIG. 5. As $k_V$ and L are constant, the force $F_R$ is therefore constant. When an extension is made to the rigid arm as is the case in the illustrated embodiment, the force at the wheel $F_W$ is $$F_W = k_V L^2/(L+S) \quad \text{(Eq. 4)}$$

where L is the length of the arm from point 60 to point 62 in FIG. 5 and S is the length of the arm from 62 to 86 in FIG. 5. Here again, because $k_V$, L and S are constant, the force $F_W$ is constant.

The result is that the downward force applied by the caster wheel remains constant throughout the stroke of the variable constant force mechanism 48. A secondary vertical spring 68 can be provided on the vertical support 54 coaxial with the vertical spring 66 that applies a greater downward force once the deflection exceeds the predefined constant force region to provide a preferred roll stiffness.

A constant force caster requires less maintenance or a reduced maintenance frequency. Tuning of the caster force profile allows the material handling vehicle equipped with the wheel configuration 10 to maintain optimal vehicle performance as the drive wheel 16 wears with reduced maintenance frequency.

Several alternative methods exist for constructing a wheel support 10 with a constant force mechanism. In lieu of the variable constant force mechanism detailed in FIG. 5, and the constant force mechanism shown in FIGS. 6-8B, a cam and follower could be used. The cam profile would be shaped to achieve the desired force profile. Likewise, a cam pulley could be used in the same fashion. Other mechanisms are available that create constant forces which are well known in the art.

Figure 10A:
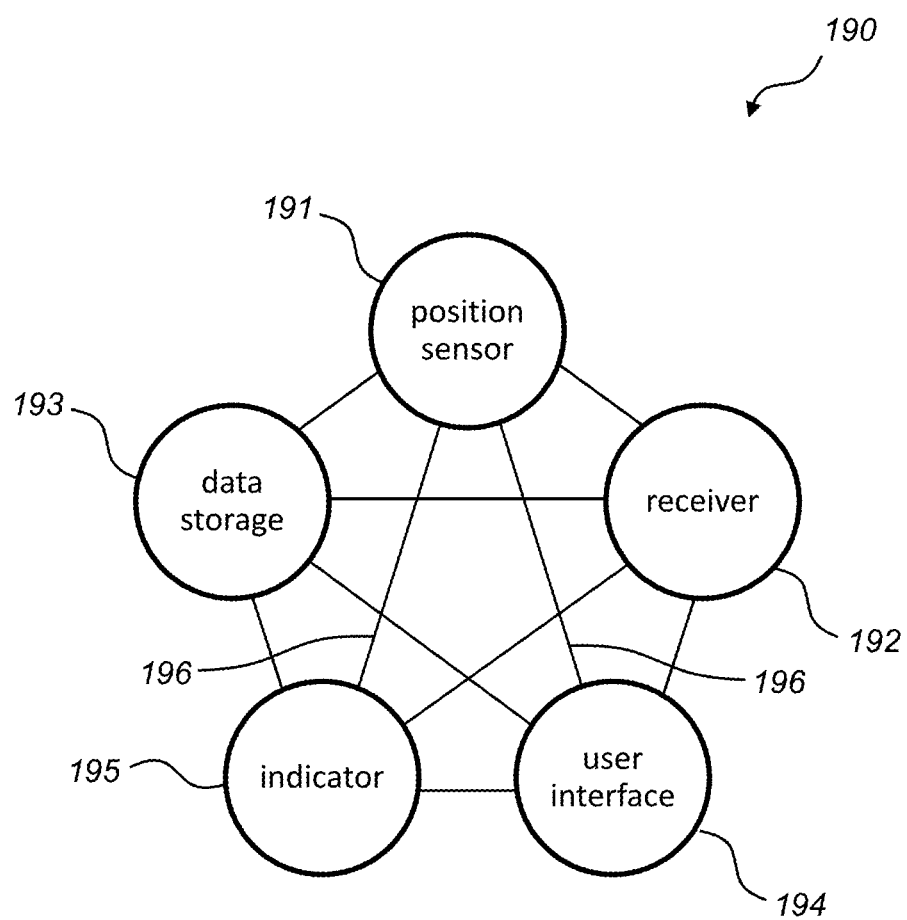
FIG. 10A is a schematic illustration of an embodiment of a position sensor system.

In addition to the wheel assembly, a material handling vehicle such as vehicle 100 can be equipped with a position sensor system 190. FIG. 10A shows a schematic illustration of one embodiment of a position sensor system 190 which can include one or more sensors 191, a receiver 192, data storage 193, user interface 194 and indicator 195. In one aspect, each of the components of the position sensor system 190 can be in communication with each of the other components of the position sensor system 190.

Figure 10B:
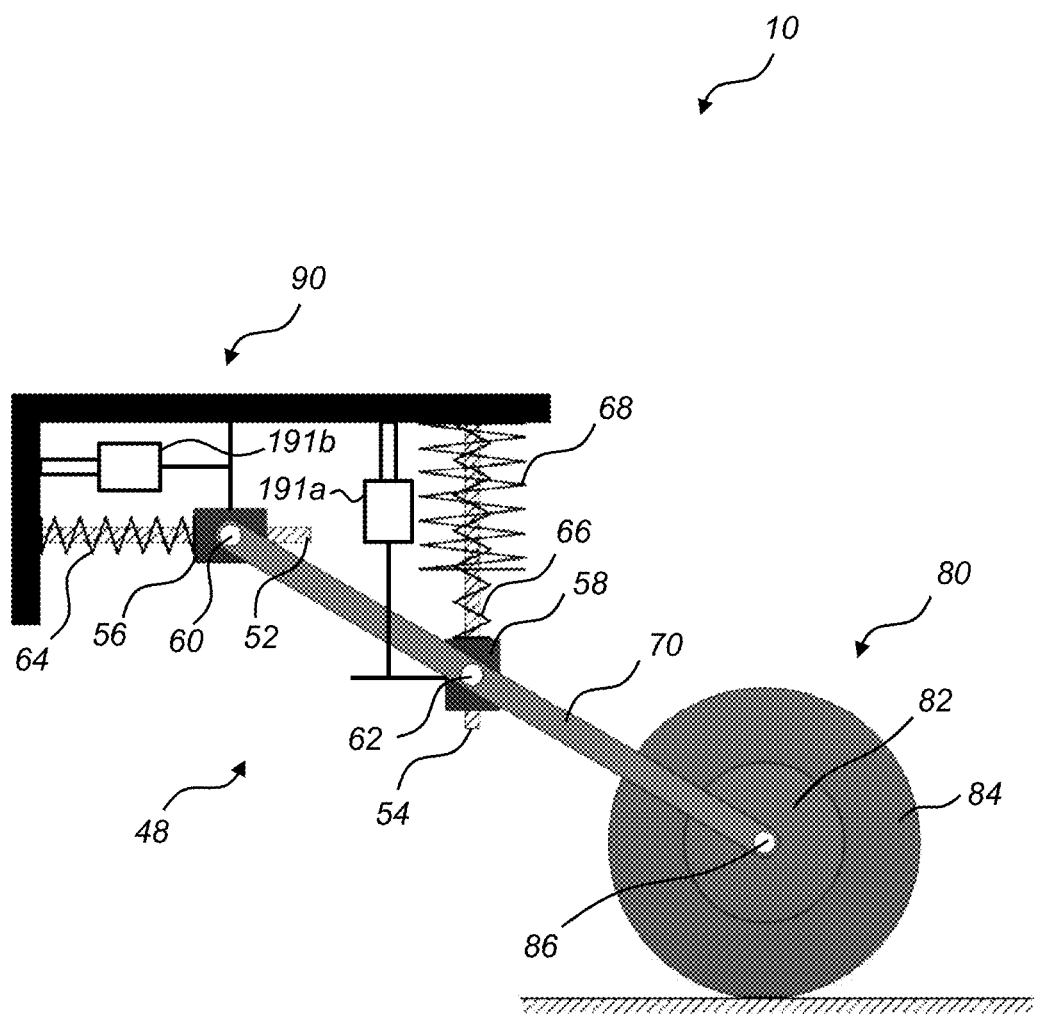
FIG. 10B is a schematic illustration of an embodiment of a caster with a variable constant force mechanism and including position sensors as part of a position sensor system.

With reference to FIG. 10B, the wheel assembly shown in FIG. 5 is illustrated showing possible locations of an exemplary position sensor 191. The position sensor 191 can measure a deflection across the caster and output a position or deflection value (see FIG. 11). The deflection provides an indication of the amount of wear (e.g., reduction in drive wheel 16 diameter) that has occurred. In one embodiment, the position sensor 191 can be a linear encoder and can be used to measure a deflection across the caster wheel (e.g., at a caster-arm pivot point). In some embodiments, the variable constant force mechanism 48 can perform best within a defined range of deflection. For example, when the measured deflection exceeds a predetermined threshold, a signal 196 can be generated by the position sensor system 190 to initiate a notice with an indicator 195 (e.g., warning message/indicator, email alert, etc.) advising personnel that the constant force caster wheel assembly measured deflection is exceeding the predetermined threshold. In one aspect, an indicator 195 can provide a notice through a user interface 194.

In some embodiments, the signal 196 can be communicated wirelessly via a bidirectional warehouse communication system with a computer system at a facility, such as a warehouse or a factory, where the vehicle operates. This enables data regarding the operating parameters to be sent to the computer system and enables the pallet truck 100 to receive data and commands from the computer system. Additionally, the warehouse communication system can be connectable through a network, such as the Intranet, to remote computers, such as at the headquarters of the company that operates the facility and at the manufacturer of the vehicle.

FIG. 10B illustrates two linear position sensors 191a and 191b. Vertical position sensor 191a can detect a vertical displacement of the vertical carriage 58, and horizontal position sensor 191b can detect a horizontal displacement of the horizontal carriage 56. In some embodiments, horizontal position sensor 191b (or vertical position sensor 191a) can serve as a back-up to vertical position sensor 191b (or horizontal position sensor 191b) to provide a redundant position sensor system. Moreover, although two linear position sensors are shown, it is to be understood that a single position sensor 191 may be included in the design of the wheel assembly 10 without departing from the scope of the invention. If a single position sensor 191 is provided, the single position sensor 191 can measure the displacement of either one of the carriages 56, 58. In still other embodiments, a single position sensor can be arranged to monitor both carriages 56, 58 simultaneously.

Figure 11:
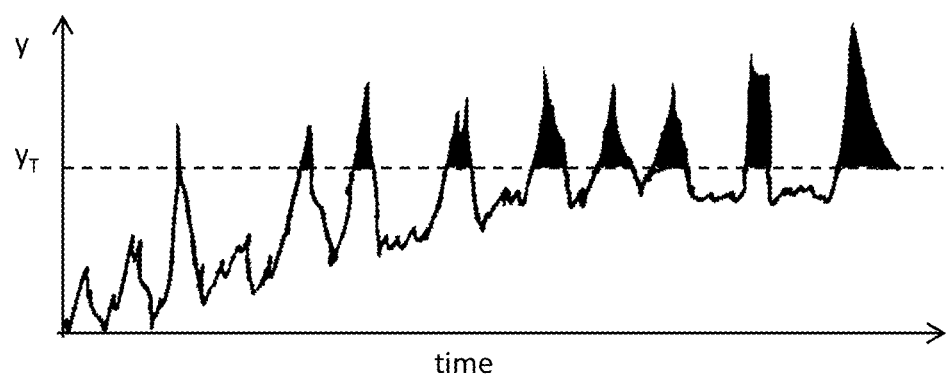
FIG. 11 is an example of a drive wheel wear profile showing drive wheel wear over time as monitored by a position sensor system.

Referring to FIG. 11, a plot of an example of a drive wheel wear profile is shown. The drive wheel wear as a function of time is monitored by way of the position sensor, such as sensor 191. In the case of a vertical position sensor, the displacement of the vertical carriage 54 can be plotted as a function of time, where y represents that displacement and $y_T$ represents a threshold value. In FIG. 11, an upward displacement (resulting in a compression of the vertical spring) results in an increase of the value of y, whereas a downward displacement (resulting in an extension of the spring) results in a decrease of the value of y. The threshold value $y_T$ may be predetermined (e.g., a factory setting) or set by a user.

Figure 12:
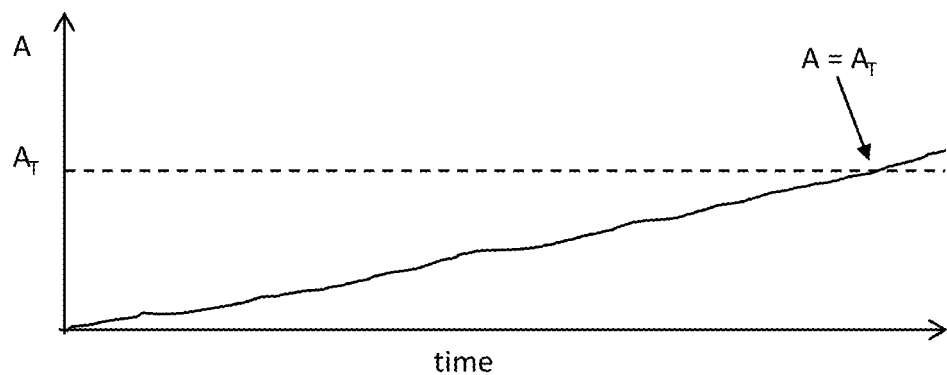
FIG. 12 is a plot showing an integration of the wear profile illustrated in FIG. 11 for values of $y > y_T$.

FIG. 12 shows a plot of an integration of the wear profile illustrated in FIG. 11 for values of $y>y_T$. In other words, the cumulative area (A) under the curve of the wear profile in FIG. 11 (shaded regions) can be monitored for displacements greater than the threshold displacement value. When the value of A equals or exceeds a threshold value $A_T$, a signal can be generated. The arrow in FIG. 12 indicates the point on the plot at which $A=A_T$. In a manner similar to the selection of $y_T$, $A_T$ may also be predetermined (e.g., a factory setting) or set by a user. The signal generated can indicate that the drive wheel may need to be repaired or replaced. Details regarding the signal are described below.

Figure 13:
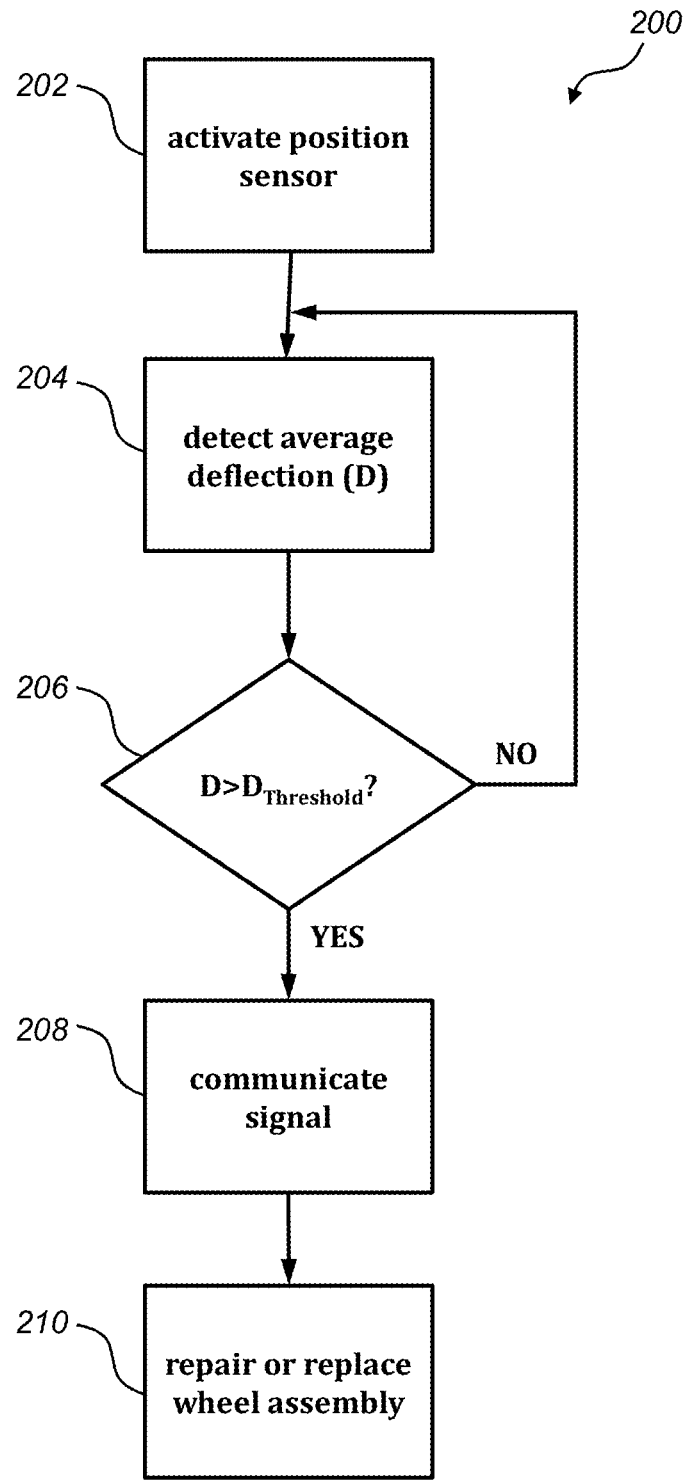
FIG. 13 is an illustration of a method for operating a position sensor system to send an indication signal.

Referring to FIG. 13, an embodiment of a process incorporating a position sensor system 190 is illustrated as a method 200. In step 202 of the method 200, the position sensor system 190 and the position sensor 191 can be activated. Activation of the position sensor system 190 can occur when the vehicle is powered on or can occur intermittently while the vehicle is in operation. In addition, the position sensor system 190 can be activated manually or automatically. For example, a user can choose to activate the position sensor system 190 to periodically determine whether a wheel assembly requires maintenance. In some embodiments, the position sensor system 190 can be reset, for example, following a maintenance procedure. Alternatively, the position sensor system 190 can be continuously active regardless of the status of the vehicle.

In a second step 204 of the method 200, the position sensor 191 can detect a property of a wheel assembly such as wheel assembly 10. The position sensor 191 can be configured to detect the deflection or average deflection of the wheel. In the case where the average deflection is detected, an average deflection value (D) can be recorded. In one example, deflection data can be transmitted from the position sensor 191 to a receiver 192 that can record the deflection data in data storage 193. In certain embodiments, D can be equivalent to y or A as seen in FIGS. 11-12. In a next step 206 of the method 200, D can be compared with a predetermined threshold value ($D_{Threshold}$). In certain embodiments, $D_{Threshold}$ can be equivalent to $y_T$ or $A_T$ as seen in FIGS. 11-12. $D_{Threshold}$ can be chosen to indicate when a signal could be communicated to a user. For example, a user can be notified with an indicator 195 to indicate when the wheel assembly requires maintenance, which can include repairing or replacing the wheel. Based on the degree of wheel wear, $D_{Threshold}$ may be selected to be a value that can be indicative of a level of wheel wear at which maintenance could be considered. Therefore, in a step 206, if D is greater than $D_{Threshold}$, than in a next step 208 of the method 200, a signal can be communicated to a user.

However, if D is less than or equal to $D_{Threshold}$, then the method 200 can return to step 204.

In the case where D exceeds $D_{Threshold}$, a user can be notified by the position sensor system 190. The notification can include a signal 196 sent by a wired or wireless communication method to a device such as a computer, cell phone, tablet or other such device or user interface 194. The notification can also include an audible or visual notification such as an intermittent or constant audible tone or light display provided by an indicator 195. When the notification is received by the user, in a step 210, the user may choose to repair or replace the wheel assembly based on the signal communicated by the position sensor system 190.

Figure 14:
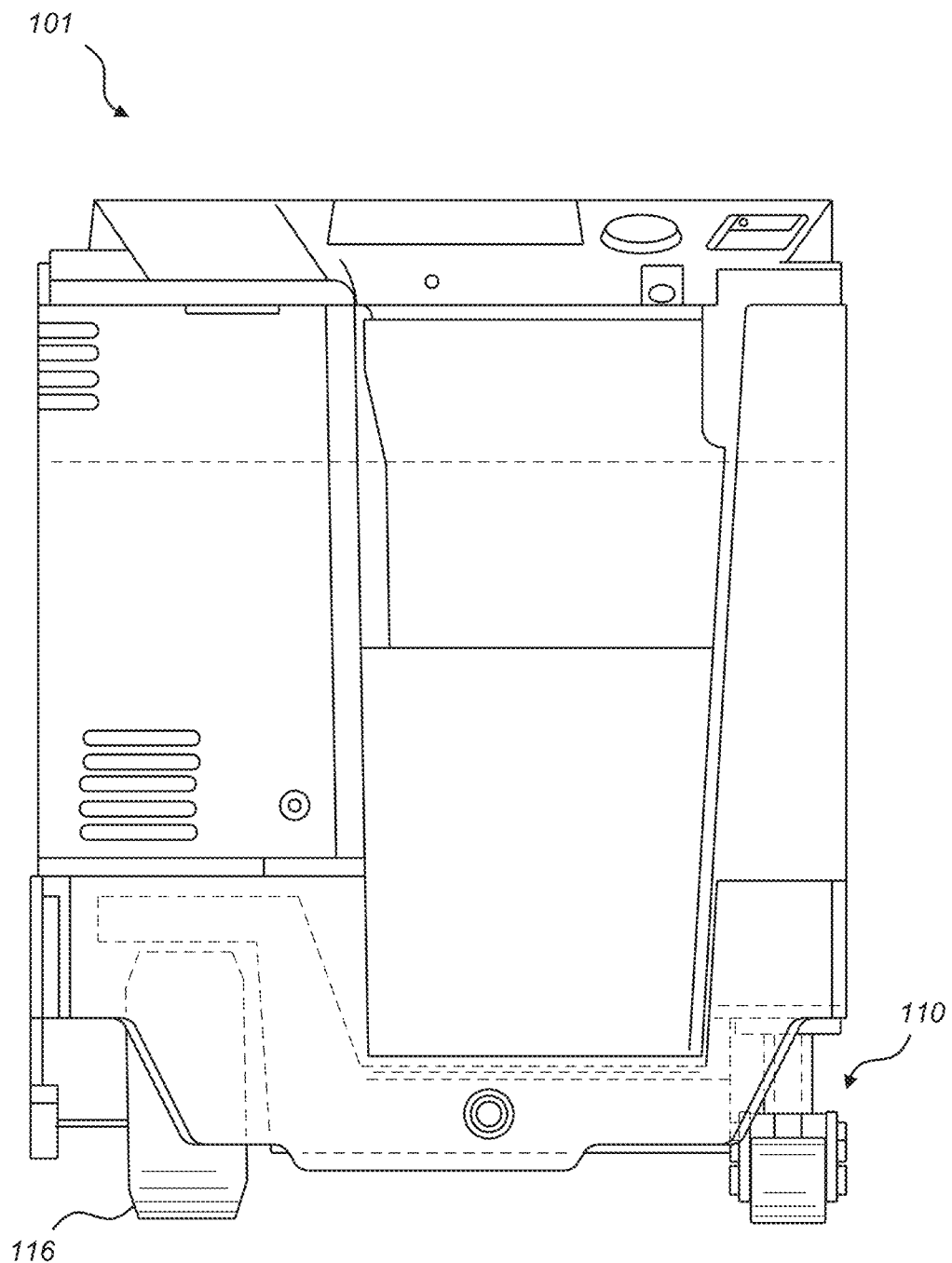
FIG. 14 is a rear view of a material handling vehicle equipped with a caster wheel assembly including a variable constant force mechanism according to the present disclosure.
Figure 15:
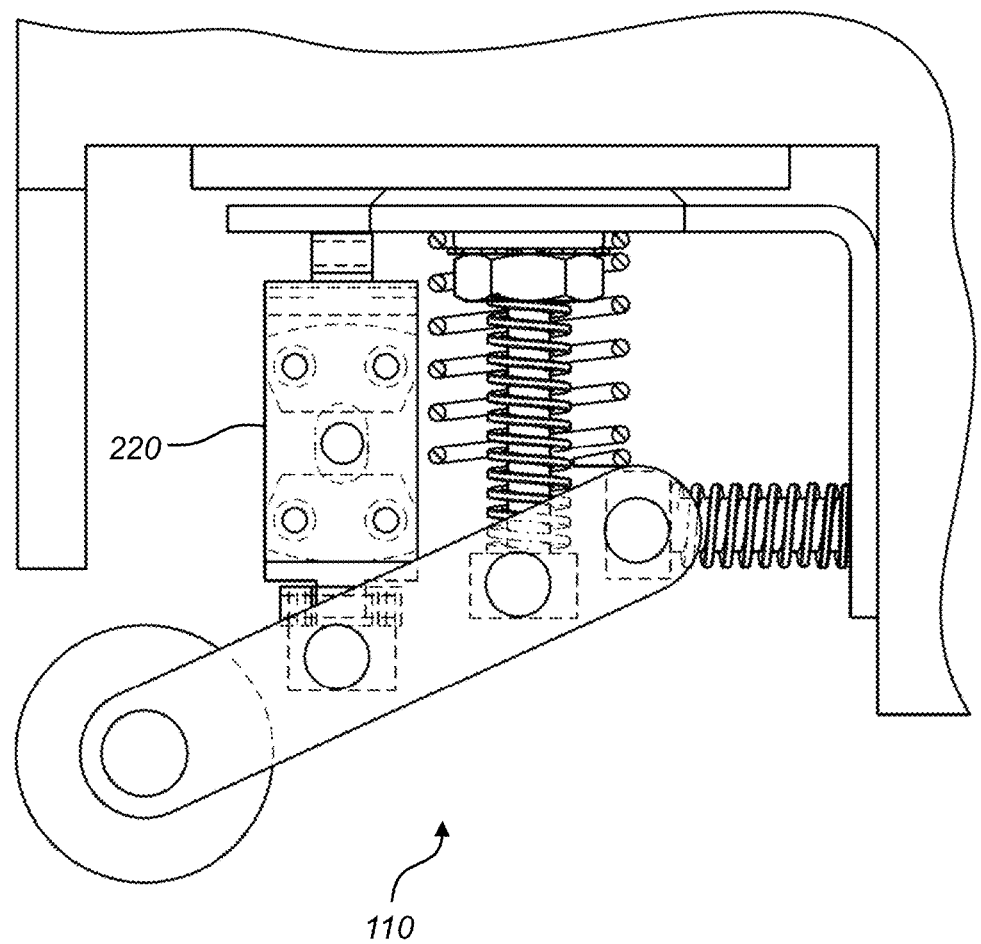
FIG. 15 is an enlarged partial side view of the material handling vehicle of FIG. 14 showing the caster wheel assembly including the variable constant force mechanism and an inertial damper.

In a further embodiment, a single caster wheel assembly including a constant force mechanism may be used on a material handling vehicle. As a non-limiting example, a caster wheel assembly including a constant force mechanism 50, or variable constant force mechanism 48 may be used on a reach truck. In general, a known reach truck may include a caster wheel and inertial damper assembly with coil springs and an inertial damper to dissipate energy. One embodiment of a reach truck 101 according to the present technology can include a single wheel assembly 110, as shown in FIGS. 14 and 15. The coil springs associated with a known caster wheel may be replaced with a constant force mechanism 50, or variable constant force mechanism 48 to provide wheel assembly 110. In one aspect, the wheel assembly 110 may exert a constant force on a ground surface as the drive wheel 116 wears. In another aspect, wheel assembly 110 may function similarly to wheel assembly 10 as shown, for example, in FIG. 5. It will be appreciated that embodiments of a reach truck 101 or other material handling vehicles may include only one wheel assembly 110 with a constant force mechanism. However, embodiments of a reach truck 101 or other material handling vehicles may also include two or more wheel assemblies 110. In some embodiments, the wheel assembly 110 can also include an inertial damper 220 to help dissipate energy.

Other constant force mechanisms in addition to those described herein and other mechanisms in general may also be used. For example, as an alternative (or in addition) to a caster wheel assembly including a constant force mechanism, a cam and follower may be used. A cam profile may be shaped to achieve a desired force profile. In another aspect, a cam pulley may be used in addition to or in place of a cam and follower.

While there has been shown and described what is at present considered the preferred embodiments of the invention, it will be appreciated by those skilled in the art that, given the benefit of this disclosure, various changes and modifications can be made without departing from the scope of the invention defined by the following claims.

We claim:

1. A wheel assembly, comprising:
    a wheel having an axle; and
    a constant force mechanism coupled to the wheel, the constant force mechanism comprising:
        a horizontal support;
        a horizontal carriage associated with the horizontal support;
        a vertical support oriented perpendicular with respect to the horizontal support;
        a vertical carriage associated with the vertical support; and
        a rigid arm that is pivotally coupled with the horizontal carriage, the vertical carriage, and the axle,
        wherein the rigid arm is coupled with the vertical carriage at a point intermediate where the rigid arm is coupled with the horizontal carriage and the axle,
        wherein the horizontal carriage is capable of being urged along the horizontal support, and
        wherein the vertical carriage is capable of being urged along the vertical support.

2. The wheel assembly of claim 1, further comprising a horizontal spring that urges the horizontal carriage along the horizontal support, and a vertical spring that urges the vertical carriage along the vertical support.

3. The wheel assembly of claim 2, wherein the vertical spring is a first vertical spring, and a second vertical spring is disposed coaxial with the first vertical spring.

4. The wheel assembly of claim 3, wherein the second vertical spring applies a greater downward force than the first vertical spring.

5. The wheel assembly of claim 1, further comprising a position sensor system that can measure a deflection across the wheel.

6. The wheel assembly of claim 5, wherein the position sensor system includes a vertical position sensor and a horizontal position sensor.

7. The wheel assembly of claim 1, wherein the vertical carriage is coupled with the rigid arm at a midpoint of the rigid arm.

8. The wheel assembly of claim 1, further comprising a support,
    wherein the support is coupled to the horizontal support and the vertical support of the constant force mechanism.

9. The wheel assembly of claim 1, wherein the support is a unitary component, and includes vertical and horizontal portions that are connected with the vertical support and the horizontal support, respectively.

10. A wheel assembly, comprising:
    a wheel having a hub and an axle;
    a support; and
    a constant force mechanism coupled to the wheel and to the support, the constant force mechanism comprising:
        a first support;
        a first carriage associated with the first support;
        a first resistance device that is coaxial with the first support;
        a second support;
        a second carriage associated with the second support;
        a second resistance device that is coaxial with the second support; and
        a rigid arm that is pivotally coupled with the first carriage, the second carriage, and the axle,
        wherein the first carriage is capable of being urged along the first support, and
        wherein the second carriage is capable of being urged along the second support.

11. The wheel assembly of claim 10, wherein the first support and the second support are perpendicularly offset.

12. The wheel assembly of claim 10, further comprising a third resistance device opposing movement of one of the first and second carriages.

13. The wheel assembly of claim 10, wherein the wheel is one of a load wheel, a drive wheel, a caster wheel, and a steering wheel.

14. The wheel assembly of claim 10, further comprising a first position sensor that measures displacement of one of the first carriage or the second carriage.

15. The wheel assembly of claim 10, wherein the first resistance device and the second resistance device are springs.

16. The wheel assembly of claim 15, wherein a first spring constant of the first resistance device and a second spring constant of the second resistance device are the same.

17. A material handling vehicle, comprising:
- a vehicle chassis;
- a fork carriage coupled to the vehicle chassis;
- at least one lifting fork coupled to the fork carriage and displaceable in at least one dimension;
- a drive wheel coupled to the vehicle chassis; and
- at least one wheel assembly coupled to the vehicle chassis, the wheel assembly comprising:
  - a wheel having an axle; and
  - a constant force mechanism coupled to the wheel, the constant force mechanism comprising:
    - a horizontal support;
    - a horizontal carriage associated with the horizontal support;
    - a vertical support oriented perpendicular with respect to the horizontal support;
    - a vertical carriage associated with the vertical support; and
    - a rigid arm that is pivotally coupled with the horizontal carriage, the vertical carriage, and the axle,
  - wherein the horizontal carriage is capable of being urged along the horizontal support, and
  - wherein the vertical carriage is capable of being urged along the vertical support.

18. The wheel assembly of claim 17, further comprising a horizontal spring that urges the horizontal carriage along the horizontal support, and a vertical spring that urges the vertical carriage along the vertical support.

19. The wheel assembly of claim 18, wherein the vertical spring is a first vertical spring, and a second vertical spring is disposed coaxial with the first vertical spring.

20. The wheel assembly of claim 17, further comprising a position sensor system that can measure a deflection across the caster wheel.

* * * * *